United States Patent [19]

Veselovsky et al.

[11] 4,323,491

[45] Apr. 6, 1982

[54] POLYURETHANE ADHESIVE COMPOSITION

[76] Inventors: Roman A. Veselovsky, Kharkovskoe shosse, 21/3, kv. 179; Anatoly N. Kuxin, ulitsa Geroev Oborony, 9/10, kv. 27, both of Kiev; Oleg A. Mudrov, ulitsa Dvinskaya, 15, kv. 164, Leningrad; Yakov I. Roitenberg, ulitsa Gagarina, 2/35, kv. 30, Kiev, all of U.S.S.R.

[21] Appl. No.: 143,464

[22] Filed: Apr. 24, 1980

[51] Int. Cl.[3] .............................................. C08L 75/06

[52] U.S. Cl. ................................ 524/144; 156/331.7; 525/2; 525/3; 528/67; 524/166; 524/215

[58] Field of Search .............................. 260/29.2 TN; 252/188.3 R; 528/67; 525/2, 3; 156/331.7

[56] References Cited

U.S. PATENT DOCUMENTS 3,401,133 9/1968 Grace et al. ................ 260/29.2 TN

*Primary Examiner*—Theodore E. Pertilla

*Attorney, Agent, or Firm*—Lilling & Greenspan

[57] ABSTRACT

An adhesive composition comprising a prepolymer of polydiethylene glycol adipate and tolylene diisocyanate, polyisocyanate, trichlor ethylphosphate, and a mixture of water, urea, and sodium sulphoricinate, the ratio of said mixture components being, respectively, 1:(0.01 to 0.3):(0.01 to 0.2), the components of the adhesive composition being in the following amounts, in parts by mass:

| | |
|---|---|
| prepolymer of polydiethylene glycol adipate and tolylene diisocyanate | 100 |
| polyisocyanate | 5 to 30 |
| trichloroethylphosphate | 1 to 60 |
| mixture of water, urea, and sodium sulphoricinate taken in the ratio of, respectively, 1:(0.01 to 0.3):(0.01 to 0.2) | 0.1 to 2 |

7 Claims, No Drawings

POLYURETHANE ADHESIVE COMPOSITION

BACKGROUND OF THE INVENTION

1. Field of the Invention

The invention relates to an adhesive composition and particularly to an adhesive composition based on polyurethanes.

Most advantageously the invention can be used for attaching synthetic heat-insulating materials to metals when building ships in open shipyards, in laying oil pipelines and gas pipelines, and also in those places where a heat insulating material is to be attached to a metal surface under any weather conditions.

Though adhesive compositions based on polyurethanes have been known for a comparatively long period of time and are widely used in industry, the problem of creating adhesive compositions possessing novel properties still exists. At present, the creation of adhesive compositions based on polyurethanes is carried out by synthesizing various hydroxyl containing components and isocyanates, by utilizing various types of bonds and their arrangement in a macromolecular chain, and by introducing various modifying additives.

2. Description of the Prior Art

Known in the art are adhesives based on iditol, nitroglyptal, and diphenyl caprolactam resins (L. Ya. Popilov, "Materialy dla sudostroyenia", Izdatelstvo "Sudostroyenie", Leningrad, 1972, p. 255). These adhesives also contain various fillers such as asbestos, or sodium silicate, or portland cement. The above adhesive compositions form a monolithic adhesive film having low adhesive strength and can be used at temperatures lower than 0° C.

The prior art also includes adhesives based on polyurethanes, produced by "Farbenfabriken Bayer A. G." (FRG) and known as "Polustal" (Zarubezhnie promyshlennie polimernie materialy i ikh komponenty, Slovar-spravochnik, Izdatelstvo Akademii Nauk SSSR, Moskva, 1963, p. 187; B. A. Dombrov, "Poliurethany, Gosudarstvennoye nauchno-tekhnicheskoye izdatelstvo khimicheskoy literatury", Moskva, 1961, p. 107) which comprises isocyanate (Desmodur TH) and hydroxyl containing polyether (Desmophen 900).

The adhesive composition comprises 40 parts by mass of a 70% Desmophen 900 solution in ethylacetate and 100 parts by mass of a 75% Desmodur TH solution in ethylacetate. To reduce the time of curing of the adhesive composition, curing accelerators are added to the latter. Heating is used to promote the curing process. As a result, a thin monolithic film of low flame resistance is formed.

Adhesives produced by "Monsanto" (B. A. Dombrov, "Proliurethany", Gosudarstvennoye nauchno-tekhnicheskoye izdatelstvo khimicheskoy literatury, Moskva, 1961, p. 112) are products of a reaction between isocyanates and polyhydric alcohols, the amount of isocyanates exceeding twice the stoichiometric amount.

The adhesive composition consists of 1 mole of polyethylene glycol 400 (molecular mass of 400) and 2 moles of tolylene diisocyanate. This adhesive is stable in storage only if the presence of moisture is precluded.

The adhesive composition is utilized in the form of a 50% solution in benzene. When applied to the surfaces of the parts to be joined, the adhesive cures at a temperature of 18° to 30° C., forming a monolithic film of low flame resistance.

However, the use of adhesives forming a monolithic film results in their high consumption when attaching heat insulation and also fitting heat insulation blocks to curvilinear surfaces.

Since ships are usually equipped with a great amount of heat insulating materials, the high consumption of adhesives per 1 $m^2$ of these materials increases the gross deadweight of the ship, thereby decreasing its carrying capacity. In addition, the monolithic adhesive layer is responsible for the deterioration in stress distribution under vibratory and dynamic loads when joining a metal and a foam plastic. Foam plastic is widely used for heat insulation. Under the action of the above loads, local failure of the adhesive layer may occur, which leads to the development of corrosion of the metal surfaces under the foam insulation. Besides, the presence of solvents makes the working conditions hazardous.

Known in the art is an adhesive composition described in USSR Inventor's Certificate No. 482,997 and comprising, in parts by mass:

| | |
|---|---|
| prepolymer of polyester and tolylene diisocyanate | 100 |
| 4,4'-diphenylmethane diisocyanate | 5 to 30 |
| trichlorethylphosphate | 1 to 60 |
| 1 to 50% solution of 2,4,6-tris (dimethylaminomethyl) phenol catalyst in water | 0.02 to 10 |

Before applying the adhesive composition to one of the surfaces to be joined together, the catalyst solution is applied thereto. The adhesive composition forms a porous adhesive joint, which considerably reduces the adhesive consumption in installing heat insulation. However, the above adhesive composition can be used for attaching heat insulation to dry or wet surfaces at temperatures not lower than 0° C., which restricts the field of application of this composition. In addition, the adhesive joint from this composition does not possess adequate adhesive strength. Also, the adhesive composition contains a great amount of toxic reactive components.

The principal object of the present invention is to provide an adhesive composition which makes it possible to upgrade the strength of the adhesive joint and, at the same time, be suitable for utilization at negative temperatures.

Another object of the invention is to reduce the content of reactive volatile components in the adhesive composition.

These and other objects of the present invention are attained with an adhesive composition comprising a prepolymer of polydiethylene glycol adipate and tolylene diisocyanate, polyisocyanate, and trichlorethylphosphate, that according to the invention, further contains a mixture of water, urea, and sodium sulphoricinate in a ratio of, respectively 1:(0.01 to 0.3):(0.01 to 0.2). The components of the adhesive composition are taken in the following amounts, in parts by mass:

| | |
|---|---|
| prepolymer of polydiethylene glycol adipate and tolylene diisocyanate | 100 |
| polyisocyanate | 5 to 30 |
| trichlorethylphosphate | 1 to 60 |
| mixture of water, urea, and sodium sulphoricinate taken in a ratio of, respectively, 1:(0.01 to | |

-continued

| | |
|---|---|
| 0.3):(0.01 to 0.2) | 0.1 to 2 |

The addition of the mixture of water, urea, and sodium sulphoricinate to the adhesive composition makes it possible to increase the shear strength of the adhesive joint. Besides, such a composition possesses a working time of more than 2 hours and can be used at negative temperatures. Another advantage of the composition of the present invention is that the content of reactive volatile components is lower than that of conventional compositions, due to control of the polyurethane chain structure and to formation in the adhesive joint of fine and equally sized pores.

It is preferable that the adhesive composition comprise a mixture of water, urea, and sodium sulphoricinate in a ratio of, respectively, 1:(0.1 to 0.3):(0.05 to 0.2) and the polyisocyanate be tolylene diisocyanate, the components of the adhesive composition being taken in the following amounts, in parts by mass:

| | |
|---|---|
| prepolymer of polyethylene glycol adipate and tolylene diisocyanate | 100 |
| tolylene diisocyanate | 5 to 20 |
| trichlorethylphosphate | 1 to 60 |
| mixture of water, urea, and sodium sulphoricinate in a ratio of, respectively, 1:(0.1 to 0.3):(0.05 to 0.2) | 0.5 to 2 |

The above modification of the adhesive composition has reduced viscosity, which ensures the penetration of this composition into small spaces between heat insulation blocks.

It is also preferable that the adhesive composition comprise a mixture of water, urea, and sodium sulphoricinate in a ratio of, respectively, 1:(0.05 to 0.3):(0.03 to 0.2) and the polyisocyanate be an adduct of tolylene diisocyanate and trimethylolpropane. The components of the adhesive composition are taken in the following amounts, in parts by mass:

| | |
|---|---|
| prepolymer of polydiethylene glycol adipate and tolylene diisocyanate | 100 |
| adduct of tolylene diisocyanate and trimethylolpropane | 5 to 30 |
| trichlorethylphosphate | 1 to 60 |
| mixture of water, urea, and sodium sulphoricinate in a ratio of, respectively, 1:(0.05 to 0.3):(0.03 to 0.02) | 0.2 to 2 |

The above modification of the adhesive composition possesses higher corrosion resistance than conventional adhesive compositions.

DETAILED DESCRIPTION OF THE INVENTION

The invention will now be described by way of the following Examples.

EXAMPLE 1

An adhesive composition of the present invention comprising, in parts by mass:

| | |
|---|---|
| a prepolymer of polydiethylene glycol adipate and tolylene diisocyanate | 100 |
| 4,4'-diphenylmethane diisocyanate | 5 |
| trichlorethylphosphate | 1 |

-continued

| | |
|---|---|
| a mixture of water, urea, and sodium sulphoricinate in a ratio of 1:0.01:0.01 | 0.1 |

was prepared by adding molten 4,4'-diphenylmethane diisocyanate in an amount of 2.5 g to the prepolymer of polyethylene glycol adipate and tolylene diisocyanate, in an amount of 50 g and preheated to a temperature of 70° C.

The prepolymer was preliminarily synthesized from polydiethylene glycol adipate having a molecular mass of 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate were stirred, whereupon trichlorethylphosphate in an amount of 0.5 g was added thereto.

The obtained composition was further stirred, while the temperature thereof was reduced to 25° C.

Prior to applying the obtained composition, a mixture of water, urea, and sodium sulphoricinate in an amount of 0.05 g was added thereto, the ratio of the above components in the mixture being 1:0.01:0.01, respectively.

The adhesive composition was applied to the surface of foam plastic which was then joined together with steel at ambient temperatures of 20° C., 0° C., and −4° C.

When the bonding operation was carried out at −4° C., steel plates covered with hoarfrost were used. The layer of hoarfrost was formed by repeatedly cooling the metal plates to a temperature of −10° C. and holding for a short period of time at a temperature of 20° C.

The obtained adhesive joint was tested for its shear strength. Also determined was the content of reactive volatile components in the adhesive. The shear strength was determined in the following way.

The prepared adhesive was applied with a putty knife to blocks of foam plastic which were 50×30×20 mm in size. Then these blocks were symmetrically attached from both sides to a joint between 100×30×2 mm metal plates joined at their short sides. To prevent the deformation of the foam plastic in the clamps of a testing machine, metal plates were bonded onto this foam plastic. The testing was carried out by applying a tension load to the samples. The samples were positioned so that the joint between the metal plates was arranged symmetrically to both clamps. The longitudinal axis of the sample was in line with the direction of the tension load. The speed of the loading clamp in the course of testing was 10 mm/min. The tension load was increased until the sample was broken, the breaking load being registered. The shear strength was determined from the formula $$\tau = \frac{P}{F} \text{ (MPa) where}$$

P is breaking load, N

F is adhesion area, $m^2$

The content of reactive volatile components in the adhesive was determined through reaction between an aqueous solution of diethanolamine and the vapors of isocyanates and chlor derivatives contained in nitrogen blown through the sample being tested, with subsequent determination of the amount of residue of diethanolamine and chlorides in the aqueous solution by titrating this solution. To determine the content of the reactive volatile components, there was previously prepared an aqueous solution of diethanolamine (2 g per liter of solution), a 0.02 N solution of nitric acid, a 0.01 N solution of mercurous nitrate, and solutions of bromocresol purple indicator (0.2 g per liter) and diphenylcarbazone indicator (0.1 g per 0.1 liter) in ethyl alcohol.

A 30±0.2 gram portion of the adhesive was placed into a three-necked reactor with a capacity of 100 ml, into which a pipet with a capacity of 1 ml and having no scale graduation was inserted. The reactor was connected with a vessel through a pipe of 5 mm in diameter and 170 mm in length. This vessel was intended for absorbing volatile components and was provided with a porous plate and sealed ground joint with a flowmeter connected thereto. The diethanolamine solution in an amount of 5 ml was introduced into said vessel. With the aid of a steam bath the temperature of the portion of the adhesive was raised to 80°±2° C., whereupon nitrogen was blown for 10 min from a compressed gas cylinder through the pipet. The nitrogen flow was controlled according to the readings of the flowmeter, so that the average flow rate was 0.5 l/min. The vessel was then disconnected from the reactor, and the diethanolamine solution was transferred into a titration flask. 2 drops of the bromocresol purple and 5 drops of diphenylcarbazone were added to the diethanolamine, whereupon the latter was titrated with the 0.02 N solution of nitric acid until the change in color from cerise to lemon yellow.

Thereafter, the 0.1 N nitric acid in an amount of 0.5 ml was added, and the solution was titrated with mercurous nitrate until the color changed to rose-violet.

Also, there was a control test by blowing nitrogen through the diethanolamine for 10 min, the titration being carried out in a manner similar to that described above, first with a nitric acid and then with mercurous nitrate.

The content of the reactive volatile components in the adhesive was determined from the formulae:

$$b_1 = 1.74(V_o - V_1 - 0.385b_2) \text{ mg}$$

$$b_2 = N_2 \cdot 130(V_2 - V_3) \text{ mg}$$

where $b_1$ is the weight of volatile isocyanate calculated as toluylene diisocyanate;

$V_o$ is the volume of nitric acid spent for titrating the control;

$V_1$ is the volume of nitric acid spent for titrating the test solution;

$b_2$ is the weight of hydrolized chlororganic derivatives calculated as aniline hydrochloride;

$N_2$ is the normality of nitric acid;

$V_2$ is the volume of mercurous nitrate spent for titrating the control;

$V_3$ is the volume of mercurous nitrate spent for titrating the control.

The obtained values represent the amounts of volatile components entrained by 5 liters of nitrogen under testing conditions, or, which is the same, the amounts of volatile components above the adhesive in 5 liters of nitrogen at a temperature of 80° C.

The results obtained were as follows:

| | |
|---|---|
| Shear strength in MPa | |
| the ambient temperature while joining the adherends being 20° C. | 0.8 |
| the ambient temperature while joining the adherends being 0° C. | 0.5 |
| the ambient temperature while joining the adherends being −4° C. | |
| the thickness of the hoarfrost layer being within the range of 0.04 to 0.07 mm | 0.5 |
| the thickness of the hoarfrost layer being within the range of 0.2 to 0.3 mm | 0.3 |
| Content of volatile components in mg | 0.01 |

At the same time, the shear strength of the adhesive joint made from the adhesive disclosed in USSR Inventor's Certificate No. 482,997 was determined. This adhesive was also tested to determine the content of volatile components therein.

The obtained results were as follows.

| | |
|---|---|
| Shear strength in MPa | |
| the ambient temperature while joining the adherends being 20° C. | 0.6 |
| the temperature while joining the adherends being 0° C. | 0.3 |
| Content of volatile components in mg | 0.9 |

EXAMPLE 2

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate in a ratio of, respectively, 1:0.3:0.2 | 2 |

was prepared by adding molten 4,4'-diphenylmethane diisocyanate in an amount of 0.06 kg to the prepolymer of polydiethylene glycol adipate and tolylene diisocyanate, taken in an amount of 0.2 kg and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

After stirring, trichlorethylphosphate in an amount of 0.12 kg was added to the obtained mixture of the prepolymer of polydiethylene glycol adipate and tolylene diisocyanate and 4,4'-diphenylmethane diisocyanate, and the mixture was further stirred, the temperature thereof being reduced, during the course of stirring, to 20° C.

Prior to applying the composition, a mixture of water, urea, and sodium sulphoricinate in an amount of 0.004 kg was added thereto, the ratio of the above components in the mixture being 1:0.01:0.01, respectively.

The adhesive composition was applied to the surface of foam plastic which then was joined together with steel plates at the following ambient temperatures: 20° C., 0° C., and −4° C.

The obtained adhesive joint was tested to determine its shear strength.

There was also determined the content of reactive volatile components in the adhesive.

The tests were carried out as described in Example 1. The obtained results were as follows:

| | |
|---|---|
| Shear strength in MPa | |
| the ambient temperature while joining the adherends being 20° C. | 1.3 |
| the ambient temperature while joining the adherends being 0° C. | 1.0 |
| the ambient temperature while joining the adherends being −4° C. | |
| the thickness of the hoarfrost layer being within the range of 0.04 to 0.07 mm | 0.8 |
| the thickness of the hoarfrost layer being within the range of 0.2 to 0.3 mm | 0.5 |
| Content of volatile components in mg | 0.02 |

At the same time, a film from the adhesive composition was made by casting the latter onto polyethylene and subjected to mechanical testing.

Tensile strength of the film was found to be 1.0 MPa.

EXAMPLE 3

The composition of the present invention comprising, in parts by mass:

| | |
|---|---|
| prepolymer of polydiethylene glycol adipate and tolylene diisocyanate | 100 |
| 4,4'-diphenylmethane diisocyanate | 5 |
| trichlorethylphosphate | 1 |
| mixture of water, urea, and sodium sulphoricinate in a ratio of, respectively, 1:0.15:0.1 | 0.1 |

was prepared by adding molten 4,4'-diphenylmethane diisocyanate in an amount of 2.5 g to the prepolymer of polyethylene glycol adipate and tolylene diisocyanate, in an amount of 50 g and preheated to a temperature of 80° C.

The prepolymer was preliminarily synthesized from polyethylene glycol adipate of molecular mass 800 and toluylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture whereupon trichlorethylphosphate in an amount of 0.5 g was added thereto. Then the mixture was further stirred, while the temperature thereof was reduced to 25° C.

Prior to applying the prepared composition, a mixture of water, urea, and sodium sulphoricinate in an amount of 0.05 g was added thereto, the ratio of the above components in the mixture being, respectively, 1:0.15:0.1.

The adhesive composition was applied to the surface of foam plastic which then was joined together with steel plates at an ambient temperature of 20° C.

The obtained adhesive joint was tested to determine its shear strength.

Also determined was the content of reactive volatile components in the adhesive.

The tests were carried out as described in Example 1.

The obtained results were as follows:

| | |
|---|---|
| Shear strength in MPa | |
| the ambient temperature while joining the adherends being 20° C. | 1.0 |
| Content of volatile components in mg | 0.03 |

EXAMPLE 4

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 5 |
| trichlorethylphosphate | 1 |
| mixture of water, urea, and sodium sulphoricinate in a ratio of, respectively, 1:0.3:0.2 | 0.1 |

was prepared by adding molten 4,4'-diphenylmethane diisocyanate in an amount of 5 g to the prepolymer of polydiethylene glycol adipate and tolylene diisocyanate, taken in an amount of 100 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred, whereupon trichlorethylphosphate in an amount of 1 g was added thereto. Then the mixture was further stirred, while the temperature thereof was reduced to 25° C.

Prior to applying the prepared composition, a mixture of water, urea, and sodium sulphoricinate in an amount of 0.1 g was added thereto, the ratio of the above components in the mixture being, respectively, 1:0.3:0.2.

The adhesive composition was applied to the surface of foam plastic which was then joined together with an aluminum plate at an ambient temperature of 0° C.

The obtained adhesive joint was tested to determine its shear strength.

Also determined was the content of reactive volatile components in the adhesive.

The tests were carried out as described in Example 1.

The results obtained were as follows:

| | |
|---|---|
| Shear strength in MPa | |
| the ambient temperature while joining the adherends being 20° C. | 0.9 |
| Content of volatile components in mg | 0.02 |

EXAMPLE 5

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 10 |
| trichlorethylphosphate | 30 |
| mixture of water, urea, and sodium sulphoricinate in a ratio of, respectively, 1:0.15:0.1 | 1 |

was prepared by adding molten 4,4'-diphenylmethane diisocyanate in an amount of 1 kg to the polymer of polydiethylene glycol adipate and tolylene diisocyanate, taken in an amount of 10 kg and preheated to a temperature of 80° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 3 kg was added thereto. Then the mixture was further stirred, while the temperature thereof was reduced to 25° C.

Before applying the prepared composition, a mixture of water, urea, and sodium sulphoricinate in an amount of 0.1 kg was added thereto, the ratio of the mixture components being, respectively, 1:0.15:0.7.

The adhesive composition was applied to the surface of foam plastic which was then joined together with parts of a ship being built, the bonding operation being carried out at an ambient temperature of 7° C. At the same time, there were prepared samples to be tested.

The adhesive joint of the samples was tested to determine its shear strength.

Also determined was the content of reactive volatile components in the adhesive.

The tests were carried out as described in Example 1.

The results obtained were as follows:

| | |
|---|---|
| Shear strength in MPa | 1.2 |
| Content of volatile components in mg | 0.03 |

In carrying out the bonding operations on the ship being built, the adhesive consumption was 0.3 to 0.4 kg per 1 $m^2$ of heat insulation. There was formed a thin elastic film from the adhesive which filled all the irregularities of the surfaces joined together. No additional adjustment of heat insulation blocks to the curvilinear parts was needed when applying heat insulation blocks to the metal surface in accordance with the curvature thereof.

EXAMPLE 6

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 10 |
| trichlorethylphosphate | 30 |
| mixture of water, urea, and sodium sulphoricinate in a ratio of, respectively, 1:0.01:0.01 | 1 |

was prepared by adding molten 4,4'-diphenylmethane diisocyanate in an amount of 2 kg to the polymer of polydiethylene glycol adipate and tolylene diisocyanate, in an amount of 20 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichloroethylphosphate in an amount of 6 g was added thereto. The mixture was further stirred, the temperature thereof being reduced, during the course of stirring, to 20° C.

Before applying the prepared composition, a mixture of water, urea, and sodium sulphoricinate in an amount of 0.2 g was added thereto, the ratio of the mixture components being, respectively, 1:0.01:0.01.

The adhesive composition was applied to a steel plate at an ambient temperature of 20° C.

The obtained adhesive joint was tested to determine the shear strength thereof.

Also determined was the content of reactive volatile components in the adhesive.

The tests were carried out as described in Example 1.

The results obtained were as follows:

| | |
|---|---|
| Shear strength in MPa the ambient temperature while joining the adherends being 20° C. | 1.0 |
| Content of volatile components in mg | 0.02 |

EXAMPLE 7

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 10 |
| trichlorethylphosphate | 30 |
| mixture of water, urea, and sodium sulphoricinate in a ratio of, respectively, 1:0.03:0.02 | 1 |

was prepared by adding molten 4,4'-diphenylmethane diisocyanate in an amount of 2 kg to the polymer of polydiethylene glycol adipate and tolylene diisocyanate, taken in an amount of 20 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 6 kg was added thereto. Then the mixture was further stirred, while the temperature thereof was reduced to 20° C.

Before applying the prepared composition, a mixture of water, urea, and sodium sulphoricinate in an amount of 0.2 kg was added thereto, the ratio of the mixture components being, respectively, 1:0.3:0.2.

The adhesive composition was applied to the surfaces of foam plastic blocks which were stuck at an ambient temperature of −2° C. to metal surfaces of a ship being built, which surfaces were covered with hoarfrost. At the same time, there were prepared samples to be tested as described in Example 1.

The obtained adhesive joint was tested to determine the shear strength thereof.

Shear strength, the ambient temperature while joining the adherends being −2° C., in MPa—1.0

In 12 hours, after the application of the adhesive, the blocks adhered to the parts of the ship being built. There was formed an elastic adhesive joint having fine pores. This joint ensured reliable bonding between the flat foam plastic blocks and curved portions of the hull of the ship. Owing to the foaming of the adhesive, the entire space between the blocks is filled therewith.

EXAMPLE 8

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate in a ratio of, respectively, 1:0.01:0.01 | 2 |

was prepared by adding molten 4,4'-diphenylmethane diisocyanate in an amount of 30 g to the polymer of polydiethylene glycol adipate and tolylene diisocyanate, taken in an amount of 100 g and preheated to a temperature of 70° C.

The prepolymer was preliminarily synthesized from polydiethylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 60 g was added thereto. Then the mixture was further stirred while the temperature thereof was reduced to 20° C.

Before applying the prepared composition, a mixture of water, urea, and sodium sulphoricinate in an amount of 0.2 g was added thereto, the ratio of the mixture components being, respectively, 1:0.01:0.01.

The adhesive composition was applied to the surface of foam plastic which was joined with aluminum plates at ambient temperatures of −4° C., 0° C., and 25° C.

The obtained adhesive joint was tested to determine the shear strength thereof.

The tests were carried out as described in Example 1.

The results obtained were as follows:

| Shear strength in MPa | |
|---|---|
| the ambient temperature while joining the adherends being −4° C. | 0.5 |
| the ambient temperature while joining the adherends being 0° C. | 1.0 |
| the temperature while joining the adherends being 25° C. | 1.3 |

EXAMPLE 9

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate taken in the ratio of, respectively, 1:0.15:0.01 | 2 |

was prepared by adding molten 4,4'-diphenylmethane diisocyanate in an amount of 60 g to the polymer of polydiethylene glycol adipate and tolylene diisocyanate, in an amount of 200 g and preheated to a temperature of 70° C.

The prepolymer was preliminarily synthesized from polydiethylene glycol adipate of molecular weight 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 120 g was added thereto. Then the mixture was further stirred while the temperature thereof was reduced to 20° C.

Before applying the prepared composition, a mixture of water, urea, and sodium sulphoricinate in an amount of 4 g was added thereto, the ratio of the mixture components being, respectively, 1:0.15:0.1.

The adhesive composition was applied to foam plastic which was joined with aluminum plates at an ambient temperature of 22° C. At the same time, there were prepared samples for a climate test. A 290×290×20 mm block was attached to a 300×300×5 mm steel plate. The thus prepared samples were placed into a cooler and held therein at a temperature of −50° C. for 12 hours, whereupon they were transferred to a thermostat and held therein at a temperature of 20° C. for 6 hours. Then the samples were placed into a thermal camera and held therein at a temperature of 65° C. for 6 hours, whereupon they were quickly transferred to the cooler and held therein at a temperature of 0° C. for 2 hours and then at a temperature of −50° C., for 10 hours.

Thus tested samples were visually examined. No deterioration of the adhesive joint was observed.

The adhesive joint was tested to determine its shear strength as described in Example 1. The test showed that, with the ambient temperature of joining the adherends being 22° C., the shear strength of the adhesive joint was 1.4 MPa.

EXAMPLE 10

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 5 |
| trichlorethylphosphate | 60 |
| mixture of water, urea, and sodium sulphoricinate in a ratio of, respectively, 1:0.01:0.01 | 2 |

was prepared by adding molten 4,4'-diphenylmethane diisocyanate in an amount of 5 g to the polymer of polydiethylene glycol adipate and tolylene diisocyanate, in an amount of 100 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate were stirred, whereupon trichlorethylphosphate in an amount of 60 g was added thereto. Then the mixture was further stirred, while the temperature thereof was reduced to 20° C.

Before application of the prepared composition, a mixture of water, urea, and sodium sulphoricinate in an amount of 2 g was added thereto, the ratio of the mixture components being, respectively, 1:0.01:0.01.

The adhesive composition was applied to foam plastic which was joined with steel plates at an ambient temperature of 10° C.

The obtained adhesive joint was tested to determine its shear strength.

Also determined was the content of reactive volatile components in the adhesive.

The results obtained were as follows:

| | |
|---|---|
| Shear strength, the ambient temperature of joining the adherends being 10° C., in MPa | 1.0 |
| Content of volatile components in mg | 0.02 |

EXAMPLE 11

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 1 |
| mixture of water, urea, and sodium sulphoricinate taken in the ratio of, respectively, 1:0.01:0.01 | 0.1 |

was prepared by adding molten 4,4'-diphenylmethane diisocyanate in an amount of 15 g to the polymer of polydiethylene glycol adipate and tolylene diisocyanate, in an amount of 50 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 0.5 g was added thereto. Then the mixture was further stirred while the temperature thereof was reduced to 20° C.

Before applying the prepared composition, a mixture of water, urea, and sodium sulphoricinate in an amount of 0.05 g was added thereto, the ratio of the mixture components being, respectively, 1:0.01:0.01.

The adhesive composition was applied to foam plastic which was joined with steel plates at an ambient temperature of 30° C.

The obtained adhesive joint was tested to determine its shear strength.

Also determined was the content of reactive volatile components in the adhesive.

The results obtained were as follows:

| | |
|---|---|
| Shear strength, the ambient temperature while joining the adherends being +30° C., in MPa | 1.4 |
| Content of volatile components in mg | 0.08 |

EXAMPLE 12

The adhesive composition of the present invention comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate in a ratio of, respectively, 1:0.3:0.2 | 0.1 |

was prepared by adding molten 4,4'-diphenylmethane diisocyanate in an amount of 15 g to the prepolymer of polydiethylene glycol adipate and tolylene diisocyanate, in an amount of 50 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer of polydiethylene glycol adipate and tolylene diisocyanate and 4,4'-diphenylmethane diisocyanate were stirred to obtain a mixture, whereupon trichlorethylphosphate in an amount of 30 g was added thereto. Then the mixture was further stirred while its temperature was reduced to 25° C.

Before applying the prepared composition, a mixture of water, urea, and sodium sulphoricinate in an amount of 0.05 g was added thereto, the ratio of the mixture components being, respectively, 1:0.3:0.2.

The adhesive composition was applied to the surface of foam plastic which was joined with a steel plate at an ambient temperature of 25° C.

The obtained adhesive joint was tested to determine the shear strength thereof.

Also determined was the content of reactive volatile components in the adhesive.

The obtained results were as follows:

| | |
|---|---|
| Shear strength in MPa | 1.0 |
| Content of volatile components in mg | 0.08 |

EXAMPLE 13

The adhesive composition of the present invention comprising, in parts by mass:

| | |
|---|---|
| prepolymer of polydiethylene glycol adipate and tolylene diisocyanate | 100 |
| tolylene diisocyanate | 20 |
| trichlorethylphosphate | 30 |
| mixture of water, urea, and sodium sulphoricinate taken in the ratio of, respectively, 1:0.3:0.2 | 1 |

was prepared by adding tolylene diisocyanate in an amount of 40 g to the prepolymer of polydiethylene glycol adipate and tolylene diisocyanate, taken in an amount of 200 g and preheated to a temperature of 50° C.

The prepolymer was preliminarily synthesized from polydiethylene glycol adipate of molecular mass 800 and tolylene diisocyanate, the ratio between hydroxyl groups and isocyanate groups being 1:2.

The prepolymer and tolylene diisocyanate were stirred to obtained a mixture, whereupon trichlorethylphosphate in an amount of 60 g was added thereto. Then the mixture was further stirred while its temperature was reduced to 25° C.

Before applying the prepared composition, a mixture of water, urea, and sodium sulphoricinate in an amount of 2 g was added thereto, the ratio of the mixture components being, respectively, 1:0.3:0.2.

The adhesive composition was applied to the surface of foam plastic which was joined with steel plates at ambient temperatures of 0° C. and 25° C. The above composition was also used for filling the space between the foam plastic blocks.

The obtained adhesive joint was tested to determine its shear strength. Also determined was the content of reactive volatile components in the adhesive and its viscosity.

The results obtained were as follows:

| | |
|---|---|
| Shear strength in MPa: | |
| the ambient temperature while joining the adherends being 0° C. | 0.8 |
| the ambient temperature while joining the adherends being 20° C. | 1.2 |
| Content of volatile components in mg | 0.02 |
| Viscosity in P | 90 |

The adhesive effectively fills 2 to 3 mm wide gaps between the foam plastic blocks.

EXAMPLE 14

The adhesive composition of the present invention comprising, in parts by mass:

| | |
|---|---|
| prepolymer of polydiethylene glycol adipate and tolylene diisocyanate | 100 |
| tolylene diisocyanate | 5 |
| trichlorethylphosphate | 30 |
| mixture of water, urea, and sodium sulphoricinate in a ratio of, respectively, 1:0.1:0.05 | 2 |

was prepared by adding tolylene diisocyanate in an amount of 5 g to the prepolymer of polydiethylene glycol adipate and tolylene diisocyanate, in an amount of 100 g and preheated to a temperature of 50° C.

The prepolymer was preliminarily synthesized from polydiethylene glycol adipate of molecular mass 800 and tolylene diisocyanate, the ratio between hydroxyl groups and isocyanate groups being 1:2.

The prepolymer and tolylene diisocyanate were stirred to obtain a mixture, whereupon trichlorethylphosphate in an amount of 30 g was added thereto. Then the mixture was further stirred while the temperature thereof was reduced to 20° C.

Before applying the prepared composition, a mixture of water, urea, and sodium sulphoricinate in an amount of 2 g was added thereto, the ratio of the mixture components being, respectively, 1:0.1:0.05.

The adhesive composition was applied to the surface of foam plastic which was joined with steel plates at ambient temperatures of −4° C., 0° C., and 20° C.

The obtained adhesive joint was tested to determine its shear strength. Also determined was the content of reactive volatile components in the adhesive.

The obtained results were as follows:

| | |
|---|---|
| Shear strength in MPa | |
| the ambient temperature while joining the adherends being −4° C. | 0.3 |
| the ambient temperature while joining the adherends being 0° C. | 0.5 |
| the ambient temperature while joining the adherends being 20° C. | 1.0 |
| Content of volatile components in mg | 0.01 |

In addition, the adhesive composition effectively fills 3 to 4 mm wide gaps between the foam plastic blocks.

EXAMPLE 15

The adhesive composition of the present invention comprising, in parts by mass:

| | |
|---|---|
| prepolymer of polydiethylene glycol adipate and tolylene diisocyanate | 100 |
| adduct of tolylene diisocyanate and trimethylpropane | 30 |
| trichlorethylphosphate | 60 |
| mixture of water, urea, and sodium sulphoricinate in the ratio of, respectively, 1:0.3:0.2 | 2 |

was prepared by adding a molten adduct of tolylene diisocyanate and trimethylpropane in an amount of 60 g to the prepolymer of polydiethylene glycol adipate and tolylene diisocyanate, in an amount of 200 g and preheated to a temperature of 70° C.

The prepolymer was preliminarily synthesized from polydiethylene glycol adipate of molecular mass 800 and tolylene diisocyanate, the ratio between hydroxyl groups and isocyanate groups being 1:2.

The prepolymer and the adduct of tolylene diisocyanate and trimethylolpropane were stirred to obtain a mixture whereupon trichlorethylphosphate in an amount of 120 g was added thereto. Then the mixture was further stirred while its temperature was reduced to 20° C.

Before applying the prepared composition, a mixture of water, urea, and sodium sulphoricinate in amount of 4 g was added thereto, the ratio of the mixture components being, respectively, 1:0.3:0.2.

The adhesive composition was applied to the surface of foam plastic which was joined with steel plates at ambient temperatures of 0° C. and 20° C.

The obtained adhesive joint was tested to determine its shear strength. Also determined was the content of reactive volatile components in the adhesive.

At the same time, a film from the adhesive composition was made by casting the latter onto polyethylene, which film was subjected to mechanical testing.

The obtained results were as follows:

| | |
|---|---|
| Shear strength in MPa | |
| the ambient temperature while joining the adherends being 0° C. | 0.6 |
| the ambient temperature while joining the adherends being 20° C. | 1.4 |
| Content of volatile components in mg | 0.01 |
| Tensile strength of the adhesive film in MPa | 1.5 |

EXAMPLE 16 (COMPARATIVE)

The adhesive composition comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate in a ratio of, respectively, 1:0.5:0.4 | 4 |

was prepared by adding molten 4,4'-diphenylmethane diisocyanate in an amount of 60 g to the prepolymer of polydiethylene glycol adipate and tolylene diisocyanate, in an amount of 200 g and preheated to a temperature of 70° C.

The prepolymer was preliminarily synthesized from polydiethylene glycol adipate of molecular mass 800 and tolylene glycol adipate, the ratio between hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 120 g was added thereto. Then the mixture was further stirred while its temperature was reduced to 25° C.

Before applying the prepared composition, a mixture of water, urea, and sodium sulphoricinate in an amount of 8 g was added thereto, the ratio of the mixture components being, respectively, 1:0.5:0.4.

The adhesive composition was applied to the surface of foam plastic which was joined with steel plates at ambient temperatures of 0° C. and 25° C.

The obtained adhesive joint was tested to determine its shear strength. Also determined was the content of reactive volatile components in the adhesive.

The obtained results were as follows:

| | |
|---|---|
| Shear strength in MPa | |
| the ambient temperature while joining the adherends being 0° C. | 0.3 |
| the ambient temperature while joining the adherends being 25° C. | 0.6 |
| Content of volatile components in mg | 0.012 |

Thus, if the ratio of water, urea, and sodium sulphoricinate is, respectively, 1:0.5:0.4, the shear strength of the adhesive joint decreases.

EXAMPLE 17 (COMPARATIVE)

The adhesive composition comprising, in parts by mass:

| | |
|---|---|
| prepolymer of polydiethylene glycol adipate and tolylene diisocyanate | 100 |
| 4,4'-diphenylmethane diisocyanate | 30 |
| trichlorethylphosphate | 60 |
| mixture of water, urea, and sodium sulphoricinate in the ratio of, respectively, 1:0.005:0.005 | 0.05 |

was prepared by adding molten 4,4'-diphenylmethane diisocyanate in an amount of 30 g to the prepolymer of polydiethylene glycol adipate and tolylene diisocyanate, in an amount of 100 g and preheated to a temperature of 70° C.

The prepolymer was preliminarily synthesized from polydiethylene glycol adipate of molecular mass 800 and tolylene diisocyanate, the ratio of hydroxyl groups and isocyanate groups being 1:2.

The prepolymer of polydiethylene glycol adipate and tolylene diisocyanate and 4,4'-diphenylmethane diisocyanate were stirred, to obtain a mixture, whereupon trichlorethylphosphate in an amount of 60 g was added thereto. Then the mixture was further stirred while its temperature was reduced to 20° C.

Before applying the prepared composition, a mixture of water, urea, and sodium sulphoricinate in an amount of 2 g was added thereto, the ratio of the mixture components being, respectively, 1:0.005:0.005.

The adhesive composition was applied to the surface of foam plastic which was joined with steel plates at ambient temperatures of −4° C., 0° C., and 20° C.

The obtained adhesive joint was tested to determine its shear strength. Also determined was the content of reactive volatile components in the adhesive.

The obtained results were as follows:

| | |
|---|---|
| Shear strength in MPa | |
| the ambient temperature while joining the adherends being −4° C. | no bonding |
| the ambient temperature while joining the adherends being °C. | 0.2 |
| the ambient temperature while joining the adherends being 20° C. | 0.5 |
| Content of volatile components in mg | 0.21 |

The use of water, urea, and sodium sulphoricinate in the ratio of, respectively, 1:0.005:0.005 as well as the decrease in the amount of the mixture in the adhesive composition lower than that indicated in the claims of the invention does not permit the foam plastic to be joined with the steel plates at negative temperatures, reduces the bonding strength at positive temperatures, and increases the content of volatile components.

EXAMPLE 18 (COMPARATIVE)

| | |
|---|---|
| The adhesive composition comprising, in parts by mass: | |
| prepolymer of polydiethylene glycol adipate and tolylene diisocyanate | 100 |
| 4,4'-diphenylmethane diisocyanate | 10 |
| trichlorethylphosphate | 30 |
| mixture of water, urea, and sodium sulphoricinate in the ratio of, respectively, 1:0.005:0.005 | 2 |

was prepared by adding molten 4,4'-diphenylmethane diisocyanate in an amount of 10 g to the prepolymer of polydiethylene glycol adipate and tolylene diisocyanate, taken in an amount of 100 g and preheated to a temperature of 70° C.

The prepolymer was preliminarily synthesized from polydiethylene glycol adipate of molecular mass 800 and tolylene diisocyanate, the ratio of hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 30 g was added thereto. Then the mixture was further stirred while its temperature was reduced to 20° C.

Before applying the prepared composition, a mixture of water, urea, and sodium sulphoricinate in an amount of 2 g was added thereto, the ratio of the mixture components being, respectively, 1:0.005:0.005.

The adhesive composition was applied to the surface of foam plastic which was joined with steel plates at ambient temperatures of −4° C., 0° C., and 20° C.

The obtained adhesive joint was tested to determine its shear strength. Also determined was the content of reactive volatile components in the adhesive.

The obtained results were as follows:

| | |
|---|---|
| Shear strength in MPa | |
| the ambient temperature while joining the adherends being −4° C. | no bonding |
| the ambient temperature while joining the adherends being 0° C. | 0.05 |
| the ambient temperature while joining the adherends being 20° C. | 0.2 |
| Content of volatile components in mg | 0.2 |

The increase in the content of the mixture of water, urea, and sodium sulphoricinate in the adhesive composition together with the use of water, urea, and sodium sulphoricinate in the ratio of, respectively, 1:0.005:0.005 results in a lower shear strength of the adhesive joint and a higher content of volatile components. No bonding is possible at negative temperatures.

EXAMPLE 19 (COMPARATIVE)

The adhesive composition comprising, in parts by mass:

| | |
|---|---|
| prepolymer of polydiethylene glycol adipate and tolylene diisocyanate | 100 |
| 4,4-diphenylmethane diisocyanate | 10 |
| trichlorethylphosphate | 30 |
| mixture of water, urea, and sodium sulphoricinate in the ratio of, respectively, 1:0.5:0.4 | 0.1 |

was prepared by adding molten 4,4'-diphenylmethane diisocyanate in an amount of 5 g to the prepolymer of polydiethylene glycol adipate and tolylene diisocyanate, in an amount of 50 g and preheated to a temperature of 70° C.

The prepolymer was preliminarily synthesized from polydiethylene glycol adipate of molecular mass 800 and tolylene diisocyanate, the ratio of hydroxyl groups and isocyanate groups being 1:2.

The prepolymer of polydiethylene glycol adipate and tolylene diisocyanate and 4,4'-diphenylmethane diisocyanate was stirred to obtain a mixture, whereupon trichlorethylphosphate in an amount of 15 g was added thereto. Then the mixture was further stirred while its temperature was reduced to 20° C.

Before applying the prepared composition, a mixture of water, urea, and sodium sulphoricinate in an amount of 0.05 g was added thereto, the ratio of the mixture components being, respectively, 1:0.5:0.4.

The adhesive composition was applied to the surface of foam plastic which was joined with steel plates at ambient temperatures of −4° C. and 20° C.

The obtained adhesive joint was tested to determine the shear strength thereof. The content of volatile components in the adhesive was also determined.

The results of the testing were as follows:

| | |
|---|---|
| Shear strength in MPa | |
| the ambient temperature while joining the adherends being −4° C. | no bonding |
| the ambient temperature while joining the adherends being 20° C. | 0.3 |
| Content of volatile components in mg | 0.32 |

Thus, the use of water, urea, and sodium sulphoricinate in the ratio of, respectively, 1:0.5:0.4 results in a higher content of volatile components. In addition, the adhesive joint is of low shear strength, and the bonding between foam plastic and a metal covered with hoarfrost fails to be accomplished.

While particular embodiments of the invention have been shown and described, various modifications thereof will be apparent to those skilled in the art and therefore it is not intended that the invention be limited to the disclosed embodiments and the departures may be made therefrom whithin the spirit and scope of the invention as defined in the claims.

What is claimed is:

1. In an adhesive composition comprising a prepolymer of polydiethylene glycol adipate and tolylene diisocyanate, polyisocyanate and trichlorethylphosphate, the improvement which comprises the inclusion of an additive mixture comprising: water, urea and sodium sulphoricinate.

2. The adhesive composition of claim 1, wherein the mass ratio of water, urea and sodium sulphoricinate in said additive mixture is 1:0.01–0.3:0.01–0.2, respectively.

3. The adhesive composition of any of claims 1 or 2, wherein the components of the adhesive composition are, in parts by mass:

| | |
|---|---|
| prepolymer of polydiethylene glycol adipate and tolylene diisocyanate | 100 |
| polyisocyanate | 5 to 30 |
| trichlorethylphosphate | 1 to 60 |
| mixture of water, urea, and sodium sulphoricinate | 0.1 to 2 |

4. The adhesive composition of claim 3, wherein said polyisocyanate is selected from the group consisting of tolylene diisocyanate, an adduct of tolylene diisocyanate, and 4,4'-diphenylmethanediisocyanate, and 4,4'-diphenylmethane diisocyanate.

5. The adhesive composition of claim 4, wherein said polyisocyanate is tolylene diisocyanate, and the components of said adhesive composition are, in parts by mass:

| | |
|---|---|
| prepolymer of polydiethylene glycol adipate and tolylene diisocyanate | 100 |
| tolylene diisocyanate | 5 to 20 |
| trichlorethylphosphate | 1 to 60 |
| mixture of water, urea, and sodium sulphoricinate in the ratio of, respectively, 1:0.1–0.3:0.05–0.2 | 0.5 to 2 |

6. The adhesive composition of claim 4, wherein said polyisocyanate is an adduct of tolylene diisocyanate and trimethylolpropane, and the components of said adhesive composition are, in parts by mass:

| | |
|---|---|
| prepolymer of polydiethylene glycol adipate and tolylene diisocyanate | 100 |
| adduct of tolylene diisocyanate and trimethylolpropane | 5 to 30 |
| trichlorethylphosphate | 1 to 60 |
| mixture of water, urea, and sodium sulphoricinate in the ratio of, respectively, 1:0.05–0.3:0.03–0.2 | 0.2 to 2 |

7. The adhesive composition of claim 4, wherein said polyisocyanate is 4,4'-diphenylmethane diisocyanate.

* * * * *